United States Patent [19]

Godsey et al.

[11] Patent Number: 4,519,713
[45] Date of Patent: May 28, 1985

[54] APPARATUS AND METHOD FOR RELINING EXTRUDER BARRELS

[75] Inventors: H. Dean Godsey, Palatine; Donald F. Schoen, Barrington; Joseph F. Turek, Hanover Park, all of Ill.

[73] Assignee: The Quaker Oats Company, Chicago, Ill.

[21] Appl. No.: 477,187

[22] Filed: Mar. 21, 1983

[51] Int. Cl.³ .............................................. B01F 7/08
[52] U.S. Cl. ...................................... 366/79; 366/318; 366/349; 29/526 R
[58] Field of Search .................. 264/127; 366/79, 279, 366/318, 349, 176 R; 425/190, 192, 204, 466, 467; 29/526 R

[56] References Cited

U.S. PATENT DOCUMENTS

| Re. 18,644 | 11/1932 | Yount . | |
|---|---|---|---|
| 2,500,340 | 3/1950 | Boulton | 29/156.4 |
| 2,686,335 | 8/1954 | Gross | 425/376 |
| 2,832,653 | 4/1958 | Wilson . | |
| 2,984,173 | 5/1961 | Roche | 425/376 |
| 3,078,511 | 2/1963 | Street | 366/279 |
| 3,451,119 | 6/1969 | Coberly | 29/446 |
| 3,466,066 | 9/1969 | Dawson . | |
| 3,691,619 | 9/1972 | Stack | 29/451 |
| 3,900,188 | 8/1975 | Seufert . | |
| 3,910,316 | 10/1975 | Reifenhauser | 29/471.1 |
| 4,133,460 | 1/1979 | Jerpbak | 29/402.08 |
| 4,251,202 | 2/1981 | Asari | 425/461 |

Primary Examiner—Robert W. Jenkins
Assistant Examiner—Arthur D. Dahlberg
Attorney, Agent, or Firm—Daniel W. Latham

[57] ABSTRACT

This invention relates to an improved method and apparatus for use in extruders of the screw type having an elongated passageway defined by a rigid barrel, the surface of which is susceptible to wear from abrasive, corrosive, adhesive or other severe wearing conditions. The improvement comprises a relinable barrel assembly having a housing, a removable sleeve liner and means for securing said liner in said housing. The housing has an elongated tapered bore therethrough, tapering from the feed end to the discharge end of the barrel (i.e. the largest cross-sectional diameter of the bore is at the feed end of the barrel). The sleeve liner has an elongated tapered exterior surface, shaped to mate tightly within the tapered bore of the housing, and an interior surface of wear resistant material, wherein the interior surface defines the passageway within which the screw of the extruder rotates. The sleeve liner is axially mated within the housing to a line-to-line fit of the tapering housing bore and sleeve liner exterior, and it is additionally secured from axial and rotational movement.

6 Claims, 4 Drawing Figures

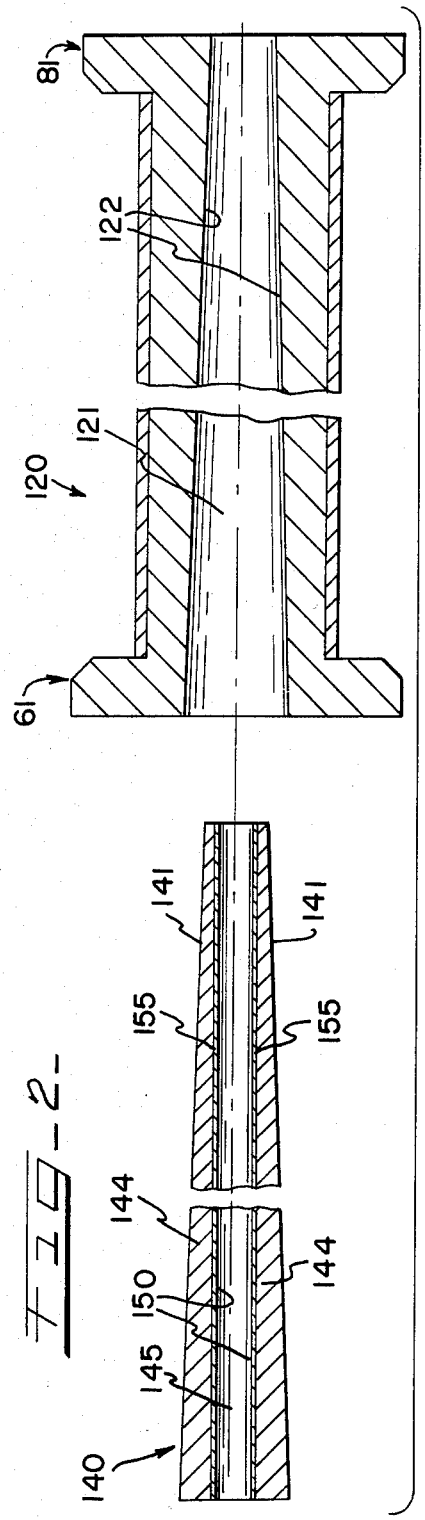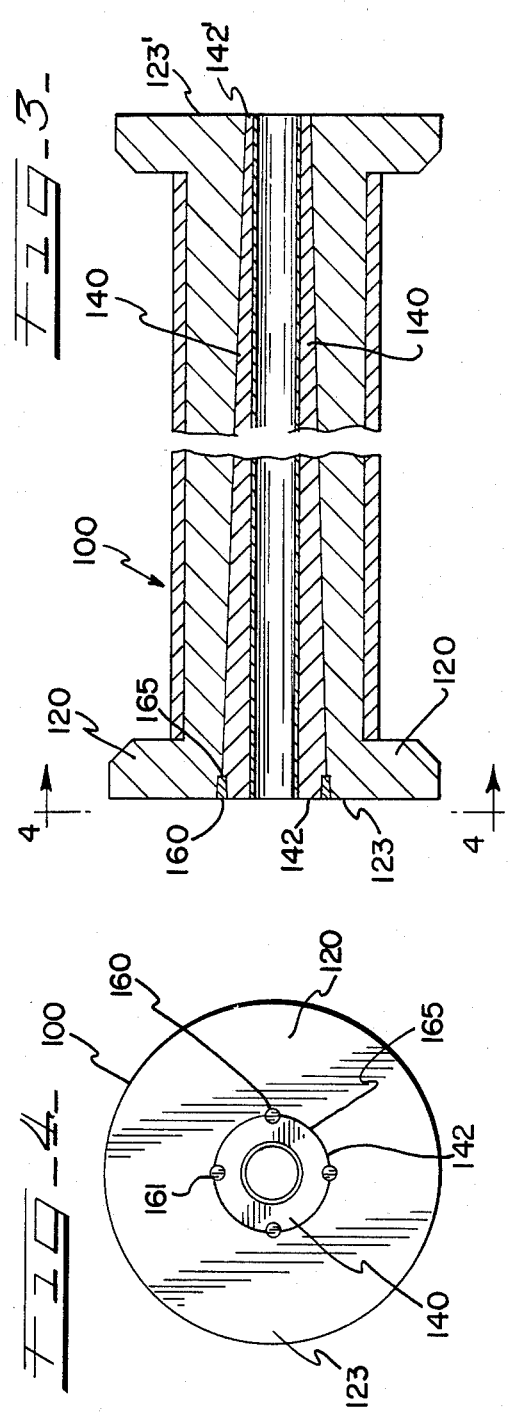

APPARATUS AND METHOD FOR RELINING EXTRUDER BARRELS

BACKGROUND OF THE INVENTION

In extruders of the screw type, a plastic, extrudable material to be processed is urged into a long passageway within a barrel in which a snugly fitting screw rotates, forcing the extrudable material toward a shaping die and heating the extrudable material by shearing it between the screw and passageway wall. The resulting high pressures, temperatures, and stresses within the extruder passageway are an essential part of processing the extrudable material but they are also a source of wear on the extruder. Abrasive wear can occur when viscous extrudable materials having abrasive components which resist shearing actions flow under high pressures across screw and passageway wall surfaces. Adhesive wear can occur when the screw and extruder passageway wall momentarily comes into contact with the extruder and forms a small weld which then immediately breaks away, leaving small, irregular pits or cracks in the screw and passageway wall surfaces. Corrosive wear can occur as a result of corrosive attack on passageway wall and screw surfaces by the material being extruded, accelerated by the high temperatures and pressures inside the extruder passageway.

Wear can have a profound effect on the efficiency and effectiveness of the extruder operations. As the passageway wall and the screw surfaces wear down, the flow of extrudable material therebetween changes, causing a reduction in the shear stresses, temperatures, and pressures within the extruder passageway resulting in inadequately processed extrudate. Also, the wiping of extrudable material from the passageway wall by rotation of the snugly fitting screw is reduced, leaving a coating of extrudable material on the passageway wall which acts as a barrier to heat transfer between the extrudable material and the barrel, thereby causing ineffective heating or cooling of the extrudable material.

Replacement of the barrel or relining of the interior of the barrel (e.g. the passageway wall) is necessary to restore effective extruder operation. Replacement of the barrel is generally expensive, especially for a large extruder. Therefore, methods have been devised to reline the interior of the barrel by providing a new passageway wall. The most commonly practiced relining methods include slip-fitting a sleeve liner into the barrel or shrink-fitting a sleeve liner into the barrel bore.

Slip-fit and shrink-fit methods both use elongated cylindrical sleeve liners having an interior passageway therethrough, the surface of which is coated with a wear and/or corrosion resistant material. Generally, sleeve liners are made by a process of high temperature spin coating in which the annular space within a section of rigid steel tubing is charged with a metal alloy and placed in a furnace. The tubing is then heated and spun along its cylindrical axis, depositing a hard metal alloy coating substantially uniformly along its interior wall. The coated wall can then be machined to form the required configuration for an extruder passageway which will fit snugly about the screw.

In the slip-fit process, a sleeve liner thus coated, is axially mated within the barrel. The barrel is first prepared by machining away the interior surfaces to create a cylindrical bore (of exacting diameter and straightness) within the barrel. The interior bore diameter is slightly larger than the exterior diameter of the sleeve liner to be slip-fit therein. The sleeve liner is then axially mated within the barrel bore by pressing it into the barrel bore.

The slip-fit method, however, oftentimes results in problems of inadequate heat transfer from the barrel through the sleeve liner and in slippage of the sleeve liner within the barrel bore during operation. These problems arise because of the difficulty of making a long straight bore within the barrel, i.e., some random deviation from straightness is inevitable. Therefore, in order to assure a fit with the straight sleeve liner, the barrel bore diameter must be made slightly larger than the exterior diameter of the sleeve liner, causing many areas along the mating surfaces between the barrel and sleeve liner to have loose contact or no contact at all. As a result of this lack of contiguous contact between the mating surfaces, heat transfer between the liner and the heating or cooling elements located on the barrel is impaired and the extrudable material is not adequately heated or cooled during processing. Also as a result of the loose fit, the sleeve liner can sometimes move axially or rotationally within the barrel bore under the forces generated during extruder operation, causing misalignment of the barrel and sleeve liner.

Modifications to the slip-fit method have been proposed to correct problems of heat transfer and sleeve liner movement. A patent issued to Seufert, U.S. Pat. No. 3,900,188, discloses a method of slip-fitting a cylindrical sleeve liner and securing it within the barrel by applying a hardening filler material between the barrel bore wall and the sleeve liner exterior surface, but that method has the disadvantage of further reducing heat transfer. Also, it is difficult to work with a hardening filler during insertion and removal of the sleeve liner.

Other modifications of the slip-fit process include using a sleeve liner having multiple segments which are shorter and thus more easily pushed into a slightly crooked barrel bore. The cross-sectional diameter of the barrel bore can therefore be machined to fit more closely within the barrel bore to improve heat transfer and retard sleeve liner movement. Those sleeve liner segments, however, have small gaps at their points of abutment within the barrel bore. Corrosion is caused on the interior surface of the barrel bore and on the sleeve liner by extrudable material which is forced through the gaps by the high pressures inside the passageway.

In the shrink-fit method, the sleeve liner is radially mated within the extruder barrel. The barrel is first prepared, in a manner similar to the slip-fit method, by machining away the passageway wall to remove the surface material and to create a cylindrical bore of exacting diameter and straightness within the barrel. The barrel bore is slightly smaller in diameter than the exterior diameter of the sleeve liner. The barrel is then heated to expand the barrel bore and while the barrel is still hot, the cooler sleeve liner, having an interior coating of wear-resistant material therein, is rapidly inserted into the bore. As the barrel cools, the barrel bore contracts and radially mates with the sleeve liner to form a tight compressive fit between the sleeve liner and the barrel.

The shrink-fit method, however, presents problems of excessive compression on the wear resistant coating, difficult removal for replacement, and difficult installation during replacement. The tight shrink-fit, accomplished by compression of the sleeve liner by the barrel, also compresses the wear resistant metal alloy coating. Since the coating tends to be hard and brittle, the barrel compression, combined with the high shearing pressures applied to the coating during extruder operation, causes the coating to flake off of the passageway wall. The compressive fit of the shrink-fit method also requires machining operations to remove a worn sleeve liner prior to replacing it, a process much more difficult than removal of a worn sleeve liner by simple pressing or driving. Finally, the installation of a shrink-fit sleeve liner within the barrel bore is a difficult process requiring exact timing and control to prevent the sleeve liner from mating at the wrong point within the barrel bore, and also requiring a substantial investment in special equipment not usually found in the machine shop of a production facility.

A modification to the shrink-fit process that aids in removal of a worn sleeve liner, but does not address other problems, was disclosed in the patent issued to Jerpbak, U.S. Pat. No. 4,133,460. The sleeve liner disclosed therein has exterior grooves which accommodate explosive charges between the sleeve liner and housing so that upon detonation of the explosive charges the sleeve liner break up for easy removal.

Outside of the screw extruder art, a variety of methods and apparatuses have been disclosed relating to sleeve type liners, but none of them teach an embodiment applicable to the relining of extruder barrels. In a patent issued to Wilson, U.S. Pat. No. 2,832,653, a substantially cylindrical sleeve liner was mated within a substantially tapering cylinder housing of a fluid pump to create a cavity between the sleeve liner and cylinder housing. The cavity can then be filled with a high pressure fluid to facilitate release of the sleeve liner from the cylinder housing. The Wilson patent does not teach the use of a tapered liner insert whose cross-sectional diameter closely matches the interior housing bore diameter, to provide contiguous contact between the surfaces and, thus permitting the heat transfer between sleeve liner and housing, which is required by a screw type extruder. In a patent issued to Boulton, U.S. Pat. No. 2,500,340, a sleeve liner is used to resurface the piston chambers of automotive master brake cylinders. The sleeve liner disclosed therein employed a maleable metal to be pressed into the piston chamber which would deform only at its ends to properly seat the sleeve liner within the piston chamber. If it were pressed into a bore as elongated as the bore within an extruder barrel, such a maleable metal would severely deform during pressing. Deformation destroys the snug fitting required in extruder barrel reliners, making the liner unuseable if the deformation is too severe.

It is therefore an object of the present invention to provide a relinable extruder barrel assembly having a rigid elongated housing and also having a rigid elongated sleeve liner closely fitting within the housing, wherein the sleeve liner is easily removable from the housing, and replacable using a slip-fit method.

Another object is to provide a relinable extruder barrel assembly having a housing and a sleeve liner that resists movement within the housing during extruder operation.

Another object is to provide a relinable extruder barrel assembly having a housing and a sleeve liner wherein the sleeve liner has a wear and/or corrosion resistant interior surface defining a passageway therethrough. The wear resistant coating surface is uniformly centered around the screw residing in the passageway, and resists flaking during slip-fitting and during extruder operation.

Another object is to provide a relinable extruder barrel assembly comprising a housing bore and a sleeve liner which are shaped to provide a substantially contiguous line-to-line fit therebetween, and therefore a uniform heat transfer between the housing and the sleeve liner is provided.

Another object is to provide a relinable extruder barrel assembly having a housing and a sleeve liner that can be readily relined at production plant level from a stock of replacement sleeve liners.

Another object is to provide a method for relining extruder barrels with a sleeve liner which may be easily removed and replaced using a slip-fit method.

SUMMARY OF THE INVENTION

These and other objects of the present invention are accomplished by the apparatus and method described and claimed herein. In accordance with the present invention, a conventional screw-type extruder is improved by a method and apparatus for relining the barrel of the extruder. The improved relinable barrel assembly of the present invention comprises an elongated rigid sleeve liner having a tapered exterior surface which is axially mated within a tapered bore within a elongated rigid housing to a substantially contiguous line-to-line fit of the tapered bore of the housing with the tapered sleeve liner exterior surface. The sleeve liner is removably secured within the housing. The barrel housing of the invention has a feed end and a discharge end, and the largest diameter of the tapered bore therethrough is at the feed end. The sleeve liner has a tapered exterior surface that is shaped to fit closely within the tapered bore of the housing. The sleeve liner also has a wear and/or corrosion resistant interior surface. When the sleeve liner is mated within the housing, and the screw is in place, the wear and/or corrosion resistant interior surface of the sleeve liner is uniformly centered around the screw, and it defines the passageway within which the screw resides and extrudable material passes.

Both the housing and sleeve liner of the barrel assembly are "elongated", that is, they have a length much greater than their width. This elongation of the barrel is required to permit adequate working of the extrudable material and adequate residence time of the extrudable material within the extruder. Conventionally, the dimensions required for elongated passageways and screws in screw-type extruders can range from a length of about 10 times diameter to a length of about 35 times diameter of the interior passageway of the barrel.

Both the housing and sleeve liner are also rigid, being composed of substantially thick metal of relatively high strength and low elasticity, in order to provide sufficient resistance to the pressures of extruder operation and also sufficient mechanical support for the elongated, and exactingly straight, extruder barrel.

The tapered bore within the housing may taper at any acute angle. However, due to the elongated nature of the housing and sleeve liner, only an exceedingly shallow taper, such as a taper from about 1 minute of angle to about 1 degree of angle, when measured with respect to the bore axis, is needed for an operable invention. The exterior surface of the sleeve liner has a substantially identical taper to that of the housing bore.

Further, the dimensions and configurations of the tapered surface of the housing bore and the exterior tapered surface of the sleeve liner are, in fact, such that when they are axially mated to a line-to-line fit, there is substantially contiguous contact between the tapered surfaces. By "line-to-line fit" we mean that the housing and sleeve liner are in direct pressural inter-engagement, tighter than a sliding fit, but not as tight as a compressive fit where significant deformation of the sleeve liner or housing would occur. "Substantially contiguous" means that, of the tapered housing and tapered sleeve liner surface available for direct contact as mated, at least three quarters of such surface is, in fact, in direct contact.

The interior surface of the sleeve liner defines the passageway within which the screw rotates and through which extrudable material passes during operation of the extruder. The interior surface is composed of a wear resistant material that is uniformly centered about the screw. The screw snugly fits within the passageway, which has a typical clearance around the screw of only a few thousandths of an inch. The interior surface of wear resistant material can be provided by either the treated or untreated material comprising the sleeve liner, or by a wear resistant material coated or otherwise bonded to the interior of the sleeve liner. A wear resistant coating material typically has a brittle character and therefore flakes when subjected to stress. In accordance with the method of this invention flaking is minimized or prevented by the unstressful nature of a tapered line-to-line fit.

Securing means are provided to prevent relative movement between the sleeve liner and the housing during extruder operation. Since the diameter of the tapered bore within the housing is greatest at the feed end of the housing, the axial forces applied to the sleeve liner by the operating extruder are in the direction of the taper and therefore tend to increase the tight line-to-line fit between the housing and the sleeve liner. Only minimal securing means are therefore required to secure the sleeve liner and housing axially. By the operation of the extruder, rotational forces are also applied to the sleeve liner which may cause the sleeve liner to turn within the housing despite the tight line-to-line fit between the housing and sleeve liner. Prevention of axial and rotational movement of the sleeve liner within the housing can be accomplished by a variety of securing means including the use of one or more keys and keyways extending between the housing and sleeve liner or even the use of components of the extruder which ordinarily extend between the housing and sleeve liner, such as pressure or temperature sensing devices. Any such securing means must also be removable, that is, capable of being removed or disengaged either by turning, pressing, driving, machining, or other means, to allow easy relining of the housing with a replacement sleeve liner.

The relinable barrel assembly of the present invention is capable of being relined through the relatively simple relining method of the present invention. Once the die, feed, and screw elements of the extruder have been removed and the means for securing the housing and sleeve liner from movement during extruder operation have been removed or disengaged, the worn sleeve liner may be removed from the housing by axially driving or pressing the sleeve from the discharge end of the barrel assembly, thereby disengaging the line-to-line fit between the tapered surfaces, and then by further pressing or pulling of the sleeve liner to remove the sleeve liner completely from the housing bore. A replacement sleeve liner is prepared by charging the annular interior of a cylindrical rigid steel tubing with a metal alloy, and then heating the liner in a furnace while spinning it along its cylindrical axis. This method deposits a hard metal alloy coating substantially uniformly along the interior wall of the sleeve liner. The coating is then machined to form the required configuration for an extruder passageway which will fit snugly about the screw. The exterior of the sleeve liner is then machined to taper the exterior to the tapered dimensions desired, thus providing a tapered replacement sleeve liner of substantially the same configuration as the worn sleeve liner, but having a new wear resistant surface for the interior passageway. The replacement sleeve liner is mated axially within the housing bore to the same line-to-line fit of the tapered housing and tapered sleeve liner surfaces previously described. Optionally but not necessarily, in order to allow for slight differences between the diameter of the housing bore and the exterior diameter of the replacement sleeve liner, the replacement sleeve liner may have a configuration slightly different from that of the worn sleeve liner in that the replacement sleeve liner is slightly longer than the housing. Thus, when the replacement sleeve liner is mated within the housing bore to a line-to-line fit, a portion of the sleeve liner projects from both ends of the housing bore. Any portion of the replacement sleeve liner extending beyond the ends of the housing is then removed by a machining process and the housing and replacement sleeve liner are thereafter secured by the securing means previously described.

Conventional extruder barrels with thick, rigid walls surrounding a wear resistant passageway can also be modified for use in the relinable barrel assemblies of the present invention. A conventional barrel may be machined to remove the wearing surface on the bore of the barrel and to create a tapered bore having a configuration that will permit a substantially contiguous line-to-line fit of the tapered housing bore with the exterior surface of a replacement sleeve liner. The replacement sleeve liner can then be mated to the housing and secured as previously described.

BRIEF DESCRIPTION OF THE DRAWINGS

FIG. 2 is a detailed cross-sectional view of individual elements of a relinable barrel assembly of the present invention showing the sleeve liner and housing elements, not yet mated.

FIG. 3 is a detailed, fragmentary cross-sectional view of a relinable barrel assembly of the present invention, as mated.

FIG. 4 is an end elevational view of the relinable barrel assembly, taken along line 4—4 of FIG. 3.

DETAILED DESCRIPTION OF THE DRAWINGS

Figure 1:
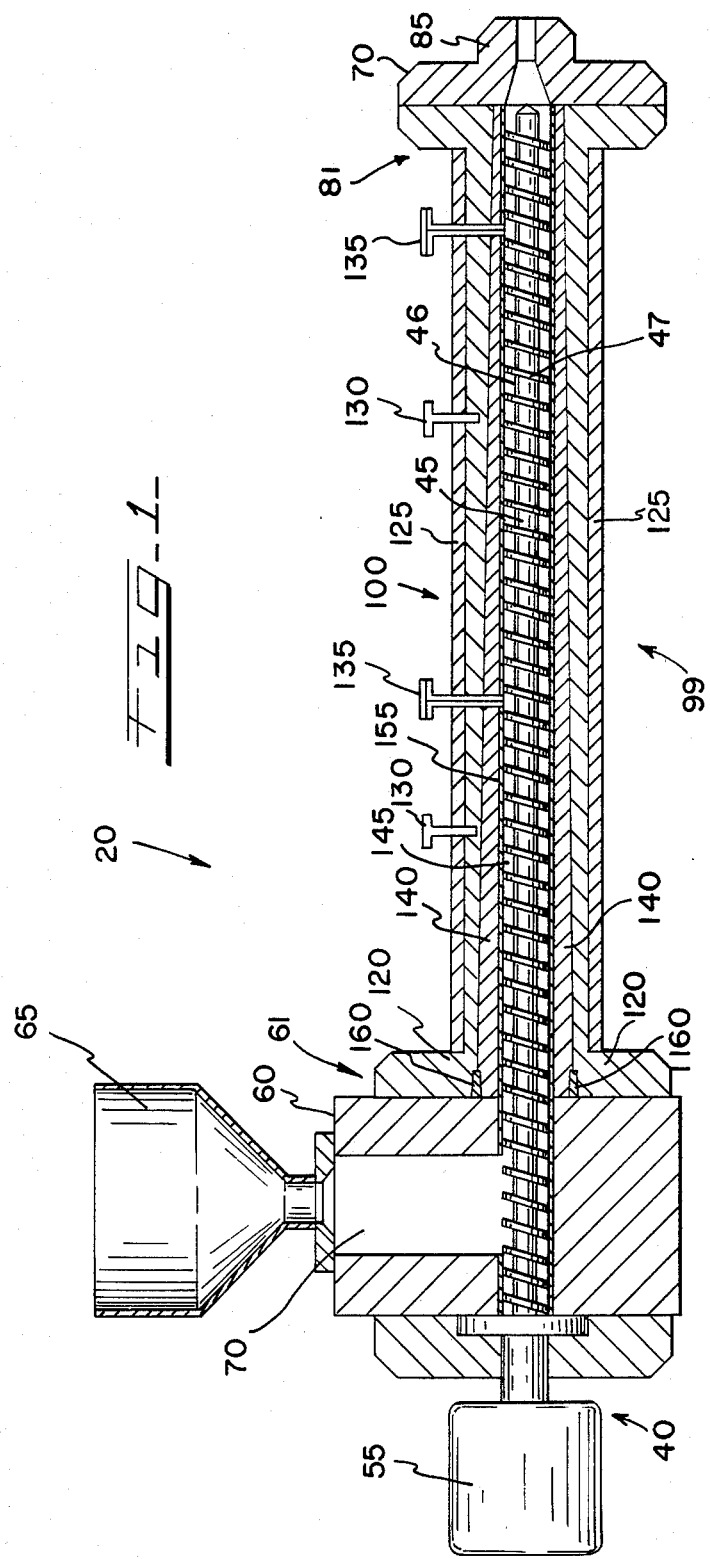
FIG. 1 is a vertical, cross-sectional elevational view of a conventional screw-type extruder, having a relinable barrel assembly in accordance with the present invention.

Generally speaking, the screw type extruder of the present invention includes an improved relinable barrel assembly comprising an elongated housing having an elongated tapered bore therethrough, and an elgonated sleeve liner having a tapered exterior surface and a wear and/or corrosion resistant interior surface. The exterior surface of the sleeve liner is shaped to fit closely within the tapered bore of the housing, such that the sleeve liner axially mates with the tapered housing bore to a substantially contiguous line-to-line fit between the tapered surface of the housing bore and the tapered exterior surface of the sleeve liner. When the sleeve liner is mated, the wear and/or corrosion resistant interior surface of the sleeve liner is uniformly centered around the extruder screw, thus defining a cylindrical passageway through the barrel from the feed end to the discharge end thereof.

The screw-type extruder 20 illustrated in FIG. 1 is an extruder of the type conventionally used to shape extrudable materials, except that extruder 20 as illustrated incorporates the features of the relinable barrel assembly 100 of the present invention. The conventional elements of screw type extruders include, impeller means 40, a feed means 60 for feeding extrudable material into the extruder 20, a discharge means 80 for discharging extrudable material from the extruder 20 and a barrel generally indicated by the numeral 99. The barrel 99 has a feed end 61 and a discharge end 81. In addition, in the embodiment illustrated, a conventional exterior heating or cooling jacket 125 and conventional temperature and pressure sensing devices, 130, 135 respectively are provided on barrel 99.

Impeller means 40 comprises extruder screw 45 and drive means 55. The extruder screw 45 has a generally cylindrical root 46 and helical ridges 47. The feed means 60 is located at the feed end 61 of barrel 99 and is of the conventional type having hopper 65 which communicates with feed chamber 70 and passageway 145 within which the screw 45 resides. The discharge means 80 is located at the discharge end 81 of the barrel and is of the conventional type having a shaping die 85 attached to the barrel 99. The shaping die 85 has a shaped opening 90 through which extrudable material can be ejected from the extruder 20.

The barrel 99 illustrated shows an embodiment of the improved relinable barrel assembly 100 of the present invention. The relinable barrel assembly 100 comprises an elgonated rigid housing 120, and elongated rigid tapered sleeve liner 140, and key means 160 for securing the tapered sleeve liner 140 within the housing 120.

Referring now to FIG. 2 which provides a detailed view of an unassembled, unmated sleeve liner 140 and a housing 120 which are in accordance with the present invention, the housing 120 has an elongated tapered bore 121 therethrough, wherein the bore 121 is larger in cross-sectional diameter at the feed end 61 and tapers to a smaller cross-section at the discharge end 81. Bore surface 122 of the bore 121 also preferably has a conical configuration extending continuously and uniformly from the feed end 61 to the discharge end 81 of the barrel housing 120 with circular cross-sections and straight tapering axial sections throughout its length.

Sleeve liner 140 has a tapered exterior surface 141 and a wear and/or corrosion resistant interior surface 150. The interior surface 150 defines the passageway 145. The interior surface 150 is provided by the wear and/or corrosion resistant coating 155 which is coated on the walls 144 of sleeve liner 140.

The sleeve liner 140 has a shallowly tapered exterior surface 141 which has the same conical taper as the tapered bore 121 of the housing 120, and has cross-sectional diameters along the length of the sleeve liner 140 suitable to provide a line-to-line fit between the sleeve 140 exterior surface 141 and the tapered bore 121 within the housing 120.

In FIG. 3, the sleeve liner 140 and housing 120 of the barrel assembly 100 are shown in the "mated" configuration. The sleeve liner 140 is mated axially within the housing 120 such that the end faces 142 and 142' of the sleeve liner 140 are flush with the end faces 123 and 123' respectively of the housing 120. Once the sleeve liner 140 is properly aligned within the housing 120, such that the faces 123, 123', 142 and 142' are aligned, keys 160 are inserted into the interface 165 between the sleeve liner 140 and the housing 120, in the preferred embodiment shown.

Referring to FIG. 4, illustrating an end view of the barrel assembly 100, in which end faces 142 and 123, respectively of the liner 140 and housing 120, are flush with each other, and the sleeve liner 140 is secured within the housing 120. Four keys 160 are shown in the form of metal dowels which have been pressed into four keyways 161 drilled across the interface 165 between the sleeve liner 140 and the housing 120.

In accordance with the relining method of the present invention, the relinable barrel assembly 100 of the present invention is lined by a simple slip fit method. The four keys 160 securing the sleeve liner 140 within the housing 120 are removed by pulling or drilling and the sleeve liner 140 is pressed or driven from the discharge end of the housing 120 until the line-to-line fit between the housing 120 and the sleeve liner 140 is released. The sleeve liner 140 is then removed completely from the housing 120 by additional pressing or pulling. A replacement sleeve liner 140 having a conical taper on the exterior surface 141 dimensioned to axially mate to a line-to-line fit within the tapered bore 121 of the housing 120 is pushed into the bore 121 to form the line-to-line fit between the housing 120 and the replacement sleeve liner 140. In preferred methods of this invention, the replacement sleeve liner 140 is slightly longer than the tapered bore 121 to allow for slight variations in diameter between the tapered bore 121 of the housing 120 and the exterior surface 141 of the sleeve liner 140. Therefore, after the housing 120 and the replacement sleeve liner 140 are mated to a line-to-line fit, portions of the sleeve liner 140 which project from the tapered bore 121 are removed by machining operations leaving the end faces 142 and 142' of the sleeve liner 140 flush with the end faces 123 and 123', respectively, of the housing 120. Keys 160 are pressed back into across the interface 165 between the housing 120 and the replacement sleeve liner 140 to secure the sleeve liner 140 with respect to the housing 120.

The method embodiments of this invention may also be practiced on conventional extruders not having a relinable barrel assembly 100 when the extruder has a barrel with a substantially thick wall surrounding a worn passageway. A housing 120 can be made by machining away any wear and/or corrosion resistant material surrounding the passageway and then by further machining the barrel to a tapered conical bore 121 with a bore surface 122 conforming to the tapered exterior surface 141 of a replacement sleeve liner 140. The replacement sleeve liner 140 can then be axially mated to a line-to-line fit within the tapered bore 121 of the housing 120 and secured as previously described.

The following example illustrates the invention, but is not to be taken as limiting the invention in any regard.

EXAMPLE

An extruder barrel used in processing extrudable cereal material having a 6 inch interior passageway and 135 inch length was machined to create a housing 120 for a replacement sleeve liner 140. The barrel was prepared by first machining the passageway to a cylindrical bore to remove the passageway surface and then by further boring and honing of the cylindrical bore to create a uniform, conical, tapered bore 121. The taper of the bore 121 was approximately 0.001 inch per inch of barrel length, measured with respect to the bore 121 axis such that the diameter of the bore 121 at the feed end of the housing 120 was about 0.27 of an inch larger than the diameter of the bore 121 at the discharge end of the housing 120. A sleeve liner 140 was then made. A piece of American Iron and Steel Institute AISI 4140 alloy steel tube which was about 5 inches longer than the housing 120 was spin coated on its interior with a nickel-cobalt-chrome alloy to a thickness of about ⅛ inch and the coating was then machined to smooth it and to axially groove it to a depth of 1/16 inch. The exterior of the seamless tubing was then machined to a configuration that conformed to the taper and diameter of the tapered bore 121 within the housing 120. The resulting sleeve liner was then axially mated within the tapered bore 121 and was pushed into the bore 121 with a hydraulic press until there was no apparent additional movement of the sleeve liner 140 into the housing 120. The portions of the sleeve liner 140 which projected from the housing 120 were then cut away by machining. Four equidistant keyways 161 were then drilled into the interface 165 between the sleeve liner 140 and the housing 120. Four keys 160 were pressed into the holes thus securing the sleeve liner 140 within the housing 120. The relinable barrel assembly 100 was subsequently placed into ordinary operation. No abnormal operational problems were encountered. Additionally, no substantial flaking from the wear resistant metal alloy coating surface 151 on the sleeve liner 140 was noted.

Although the above description and example of the invention are disclosed herein for the purpose of describing the invention to those with ordinary skill in the art, it is not intended that each and every obvious modification and variation of the invention be described in detail. It is intended, however, that all obvious modifications and variations be included within the scope of the invention.

We claim:

1. In an extruder of the screw type, having an elongated barrel and impeller means, said barrel having a feed end and a discharge end and a passageway therebetween, said impeller means comprising a drive means and an elongated screw snugly and rotatably residing within said passageway, the improvement wherein said barrel consists of a relinable assembly comprising:
   a. an elongated rigid housing having an elongated tapered bore therethrough, wherein the cross-section diameter of the bore is larger toward the feed end of the barrel and tapers to a smaller cross-section diameter at the discharge end;
   b. a rigid elongated sleeve liner, having a tapered exterior surface and a wear and/or corrosion resistant interior surface defining said passageway, wherein the exterior surface of the sleeve liner is shaped to fit closely within the tapered bore of the housing, and wherein the sleeve liner axially mates within the tapered bore of the housing to a substantially contiguous line-to-line fit at an interface between the interior tapered surface of the housing bore and the tapered exterior surface of the sleeve liner, and wherein, when the sleeve liner is mated within the tapered bore, the wear and/or corrosion resistant interior surface is uniformly centered around the screw; and
   c. means for removably securing the sleeve liner within the housing.

2. The extruder of claim 1 wherein the elongated sleeve liner has a length greater than 10 times the diameter of the passageway.

3. The extruder of claim 1 wherein the tapered bore through the housing has a taper of more than 1 minute of angle and less than 1° of angle measured with respect to the bore axis.

4. The extruder of claim 1 wherein the means for removably securing the sleeve liner comprises:
   a. at least one keyway wherein the keyway extends across the interface created by the axial mating of the tapered exterior surface of the sleeve liner and the tapered bore of the housing; and
   b. at least one key shaped to fit closely within the keyway, wherein one key is mated within each keyway.

5. The extruder of claim 1 wherein the wear and/or corrosion resistant interior surface comprises a metal alloy coating on the interior surface of the sleeve liner.

6. The extruder of claim 1 wherein the elongated tapered bore is conical, tapering uniformly from the feed end to the discharge end and having a circular cross-section.

* * * * *